(12) United States Patent
Nyman et al.

(10) Patent No.: US 10,260,744 B2
(45) Date of Patent: Apr. 16, 2019

(54) CHEMICAL RECOVERY BOILER

(71) Applicant: Valmet Technologies Oy, Espoo (FI)

(72) Inventors: Jussi Nyman, Tampere (FI); Taisto Rajala, Valkkinen (FI); Ari Saarela, Lempaeaelae (FI)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 15/832,400

(22) Filed: Dec. 5, 2017

(65) Prior Publication Data

US 2018/0180284 A1    Jun. 28, 2018

(30) Foreign Application Priority Data

Dec. 22, 2016  (FI) ...................................... 20166012

(51) Int. Cl.
*F23J 15/00* (2006.01)
*D21C 11/12* (2006.01)
(Continued)

(52) U.S. Cl.
CPC .............. *F23J 15/003* (2013.01); *D21C 11/12* (2013.01); *F22B 21/40* (2013.01); *F22B 31/045* (2013.01); *F22G 3/006* (2013.01); *F22G 7/14* (2013.01)

(58) Field of Classification Search
CPC ......... F22G 3/006; F22B 31/045; F22B 21/40
See application file for complete search history.

(56) References Cited

U.S. PATENT DOCUMENTS 2,803,227 A * 8/1957 Marshall ............... F22B 37/202
                                              122/235.11
3,169,512 A * 2/1965 Hochmuth ........... D21C 11/063
                                              122/481
(Continued)

FOREIGN PATENT DOCUMENTS

CA        1328787 C      4/1994
EP        1188986 A2     3/2002
(Continued)

OTHER PUBLICATIONS

Finnish Patent and Registration Office, Office Action for Application No. 20166012, dated Jul. 5, 2017, 6 pages, Finland.
(Continued)

*Primary Examiner* — Nathaniel Herzfeld
(74) *Attorney, Agent, or Firm* — Alston & Bird LLP (57) ABSTRACT

A chemical recovery boiler (100), including a furnace (1), comprising a front wall (2), a back wall (3), and the back wall (3) comprising a nose arch (4). The boiler further comprises at least one superheater (5) arranged in upper part of the furnace (1), and a screen pipe system (6), comprising an obliquely arranged screen pipe section (7) positioned before/under the at least one superheater (5) in the furnace (1). The obliquely arranged screen pipe section (7) comprises screen pipes (8) ascending (i) either from the front wall (2) to the back wall (3), and arranged to turn back in a turn (13) from the back wall (3) and extend obliquely upwards from the back wall (3), or (ii) from the back wall (3) to the front wall (2), and arranged to turn back in a turn (13) from the front wall (2) and extend obliquely upwards from the front wall (2). The screen pipe system (6) further comprises a vertically arranged screen pipe section (9) extending from the obliquely arranged screen pipe section (7). The screen pipes (8) of the vertically arranged screen
(Continued)

pipe section (9) are arranged to extend parallel with the at least one superheater (5) in upper part of the furnace (1).

13 Claims, 6 Drawing Sheets

(51) Int. Cl.
  *F22B 21/40* (2006.01)
  *F22B 31/04* (2006.01)
  *F22G 3/00* (2006.01)
  *F22G 7/14* (2006.01)

(56) References Cited

U.S. PATENT DOCUMENTS

| | | | | |
|---|---|---|---|---|
| 3,625,186 | A | * | 12/1971 | Herbst ............... F22B 31/045 122/448.1 |
| 6,178,924 | B1 | * | 1/2001 | Hakulinen ............ D21C 11/12 122/235.33 |
| 9,310,075 | B2 | | 4/2016 | Mikkulainen et al. |
| 2002/0189553 | A1 | * | 12/2002 | Ruohola ................ F22D 1/36 122/7 R |
| 2010/0154691 | A1 | * | 6/2010 | Sainio .................. D21C 11/12 110/348 |
| 2012/0186541 | A1 | * | 7/2012 | Miikkulainen ........ B01D 53/56 122/4 D |

FOREIGN PATENT DOCUMENTS

| | | |
|---|---|---|
| EP | 1188986 A3 | 3/2002 |
| EP | 3002366 A1 | 4/2016 |
| WO | WO 2000/29666 A1 | 5/2000 |
| WO | WO 2010/119177 A2 | 10/2010 |
| WO | WO 2010/119177 A3 | 10/2010 |
| WO | WO 2014/044911 A1 | 3/2014 |

OTHER PUBLICATIONS

Finnish Patent and Registration Office, Search Report for Application No. 20166012, dated Jul. 5, 2017, 1 page, Finland.

European Patent Office, Extended European Search Report for Application No. 17209819.6, dated Mar. 16, 2018, 5 pages, Germany.

* cited by examiner

CHEMICAL RECOVERY BOILER

CROSS REFERENCE TO RELATED APPLICATIONS

This application claims priority to Finnish Patent Application No. 20166012, filed on Dec. 22, 2016, the contents of which as are hereby incorporated by reference in its entirety.

BACKGROUND

Related Field

The invention relates to a chemical recovery boiler, including a furnace comprising a front wall, a back wall, and the back wall comprising a nose arch, at least one superheater arranged in upper part of the furnace, the chemical recovery boiler further including a screen pipe system.

Description of Related Art

In a production process, black liquor is burnt in a chemical recovery boiler. The tasks of a chemical recovery boiler include recovery of chemicals and recovery of thermal energy generated in the burning process.

The chemical recovery boiler comprises a furnace fed with black liquor and air required for combustion. An upper part of the boiler is provided with superheaters, and a flue gas duct after the superheater area. In the flue gas duct reside a boiler bank and economizers. The thermal energy generated in the burning process is used for producing superheated high-pressure steam to be used, inter alia, in the production of electricity.

The furnace comprises quite often a screen pipe system arranged before the superheaters. The pipes of the screen pipe system extend from the front wall of the furnace to a nose arch that is arranged to guide a flow of the flue gases, and through the nose arch to the front part of the flue gas duct.

However, there is still a need for improving efficiency of the chemical recovery boilers.

BRIEF SUMMARY

Viewed from a first aspect, there can be provided chemical recovery boiler, comprising an obliquely arranged screen pipe section positioned before/under the at least one superheater in the furnace, the obliquely arranged screen pipe section comprising screen pipes ascending (i) either from the front wall to the back wall, and arranged to turn back in a turn from the back wall and extend obliquely upwards from the back wall, or (ii) from the back wall to the front wall, and arranged to turn back in a turn from the front wall and extend obliquely upwards from the front wall, and wherein the screen pipe system further comprises a vertically arranged screen pipe section extending from the obliquely arranged screen pipe section, wherein the screen pipes of the vertically arranged screen pipe section are arranged to extend parallel with the at least one superheater in upper part of the furnace.

An advantage of the invention is that the length of the non-heated screen pipe section may be reduced, and thus the effective heat surface of the screen pipe section may be increased.

Another advantage is that the lay-out of the heat surfaces may be more flexible than in known chemical recovery boilers.

Still another advantage is that the erection of the construction of the screen pipe section may be simpler and thus the erection time shorter.

Still another advantage is that it is possible to install more heat surface in the second pass of the chemical recovery boiler, i.e. in boiler generation bank (B.G.B) or economiser III (eco III), because there is no need for space or room reserved for the screen pipe.

Still another advantage is that there may be larger margin to sticky area due to a more effective flue gas cooling.

The arrangement is characterised by what is stated in the independent claim. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

BRIEF DESCRIPTION OF THE FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION OF VARIOUS EMBODIMENTS

Figure 1:
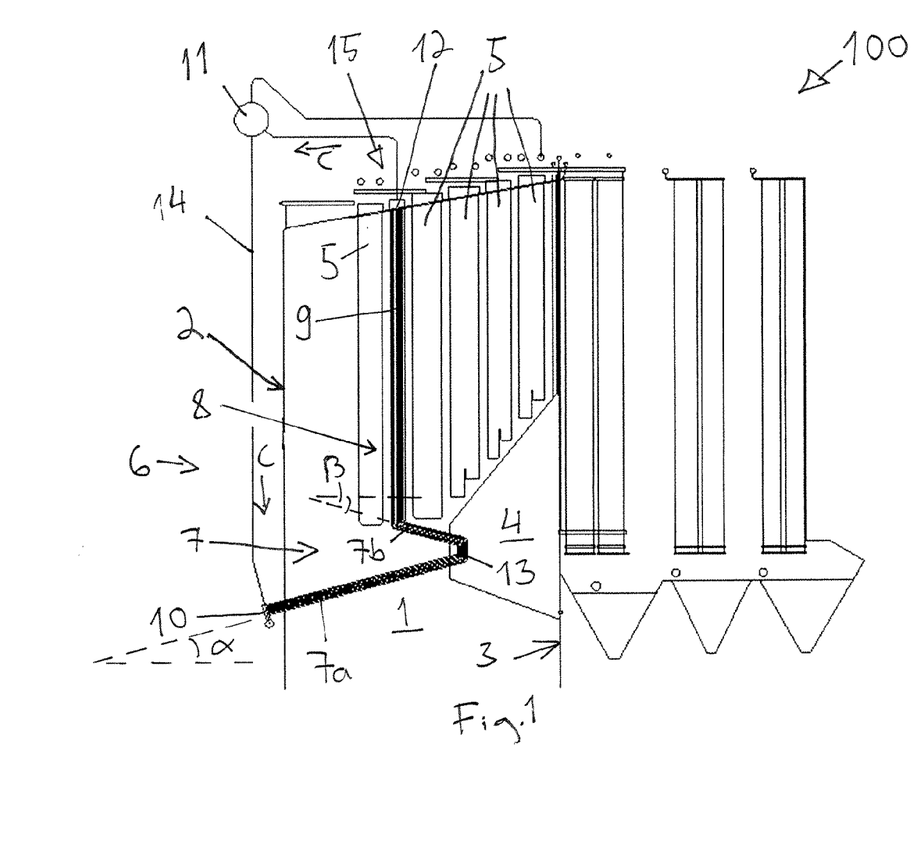
FIG. 1 is a schematic, partially sectional side view of a chemical recovery boiler.

FIG. 1 is a schematic, partially sectional side view of a chemical recovery boiler. Said chemical recovery boiler 100 may be e.g. a black liquor recovery boiler or a kraft recovery boiler.

The chemical recovery boiler comprises a furnace 1 into which black liquor to be burnt and combustion air is fed.

An upper part of the furnace 1 of the chemical recovery boiler is provided with superheaters 5. The superheaters 5 are elements formed by a plurality of parallelly located vertical pipes and provided parallelly in a plural number in a transverse direction of the chemical recovery boiler. The superheaters 5 contain steam flowing therein and heating up when the pipes are heated by hot flue gases from outside.

The chemical recovery boiler comprises a nose arch 4 that guides flow of the flue gases.

The chemical recovery boiler 100 further comprises a water and steam system. This includes a drum 11 wherefrom warm water and steam are conveyed to the temperature surfaces of the chemical recovery boiler 100.

The furnace 1 comprises a front wall 2 and a back wall 3. The back wall 3 includes the nose arch 4 mentioned above.

A screen pipe system 6 is arranged in the furnace 1. In the screen pipes 8, cooling fluid flows and heats up due to the influence of flue gases passing by. Correspondingly, this causes the temperature of the flue gases to drop before they reach the superheaters 5. In addition, the screen pipe system 6 protects the superheaters 5 from direct radiation of the furnace 1.

The screen pipe system 6 comprises screen pipes 8. The screen pipes 8 may be arranged in-line or staggered known per se. The screen pipes 8 are arranged in an obliquely arranged screen pipe section 7 positioned before any of the superheaters 5, and a vertically arranged screen pipe section 9 extending up from the obliquely arranged screen pipe section 7.

In the embodiment shown in FIG. 1, the obliquely arranged screen pipe section 7 comprises screen pipes 8 ascending from the front wall 2 to the back wall 3, and then arranged to turn back in a turn 13 from the back wall 3 and to extend obliquely upwards from the back wall 3.

The screen pipes 8 in the vertically arranged screen pipe section 9 are arranged to extend parallel with at least one superheater 5 in upper part of the furnace 1. In the embodiment shown in FIG. 1, the vertically arranged screen pipe section 9 is arranged between two superheaters 5, more precisely between the first and second superheaters. In another embodiment, the vertically arranged screen pipe section 9 is arranged between second and third superheaters. In still another embodiment, the vertically arranged screen pipe section 9 is placed after the third superheater.

In still another embodiment, the vertically arranged screen pipe section 9 is arranged between a superheater and another heat surface.

The mechanical support for the screen pipe system 6 may be arranged by tying it to the superheaters, or supporting it independently between superheaters.

Cooling fluid received from the drum 11 of the chemical recovery boiler 100 may be fed via one or more feed pipes 14 in the lower end 10 of the obliquely arranged screen pipe section 7, as shown in FIG. 1. The arrangement of the one or more feed pipes 14 on the front wall 2 is simple to realize.

In the embodiment shown on FIG. 1, the cooling fluid received by the screen pipe system 6 comprises water. In some embodiments, the cooling fluid may be totally of water. In another embodiment, the cooling fluid may comprise water and steam. In still another embodiment, the cooling fluid may be totally of steam.

Outlet header(s) 15 of screen pipe system are located above a furnace roof. The cooling fluid passed the screen pipe system 6 is arranged to flow from said header(s) 15 directly to the drum 12 or to a heat surface for further heating. The cooling fluid exiting form the screen pipe system 6 is typically mixture of steam and water.

In an embodiment, the turn 13 is arranged on the nose arch 4 as shown in FIG. 1.

An advantage is that, the structure of the obliquely arranged screen pipe section 7 is short and rigid. Furthermore, it is rather easy to build a maintenance level above the obliquely arranged screen pipe section 7 in shut-offs.

The obliquely arranged screen pipe section 7 penetrates through the nose arch 4 such that the turn 13 is placed outside of the volume of the furnace 1.

An advantage is that a strong and firm support for the turn 13 and actually for the whole obliquely arranged screen pipe section 7 may be realized.

In another embodiment, the turn 13 is arranged inside the volume of the furnace 1 (not shown).

An advantage is that the length of the non-heated screen pipe section may be minimized and easy installation of the turn 13.

According to an aspect of the invention, the obliquely arranged screen pipe section 7 comprising screen pipes 8 ascending to the turn 13 has an angle α to horizontal level, said angle α being in range of 5° to 20°. In an embodiment, angle α is in range of 10° to 15°.

According to another aspect of the invention, the obliquely arranged screen pipe section 7 comprising screen pipes 8 ascending from the turn 13 to the vertically arranged screen pipe section 9 has an angle β to horizontal level, said angle β being in range of 5° to 20°. In an embodiment, angle β is in range of 10° to 15°.

According to an aspect, the screen pipe system 6 may comprise more than just one turn 13 and more than just one obliquely arranged screen pipe section 7, respectively. In other words, there may be two or even more turns 13 in the screen pipe system 6. The turns 13 may all be arranged on the same wall 2, 3 or there may be at least one turn on both front wall 2 and the back wall 3.

In an embodiment, all the screen pipes 8 follow the same routing in the boiler 100.

In another embodiment, some of the screen pipes 8 have a different routing as some other screen pipes of the same screen pipe system 6. For instance, some pipes may pass the turn 13.

Figure 2:
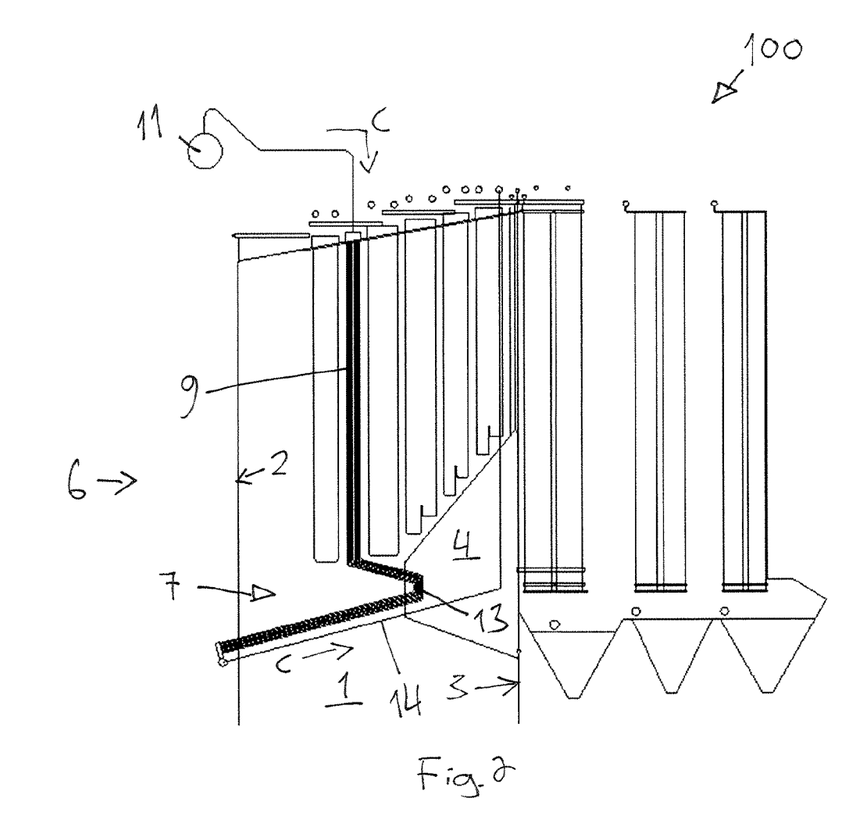
FIG. 2 is a schematic, partially sectional side view of another chemical recovery boiler.

FIG. 2 is a schematic, partially sectional side view of another chemical recovery boiler. In an embodiment, such as shown in FIG. 2, the upper end 12 of the vertically arranged screen pipe section 9 is arranged to receive cooling fluid from the drum 11.

An advantage is the screen pipe system 6 may be used as a superheater that receives saturated steam from the drum 11.

In the embodiment show in FIG. 2, the upper end 12 is directly connected to the drum 11 by one or more feed pipe(s) 14. In another embodiment, there is at least one heat surface arranged between the drum 11 and the screen pipe system 6, i.e. the upper end 12 is indirectly connected to the drum 11.

The lower end 10 of the screen pipe system 6 may be connected to a heat surface for further heating. The cooling fluid exiting form the screen pipe system 6 is typically saturated steam.

Figure 3:
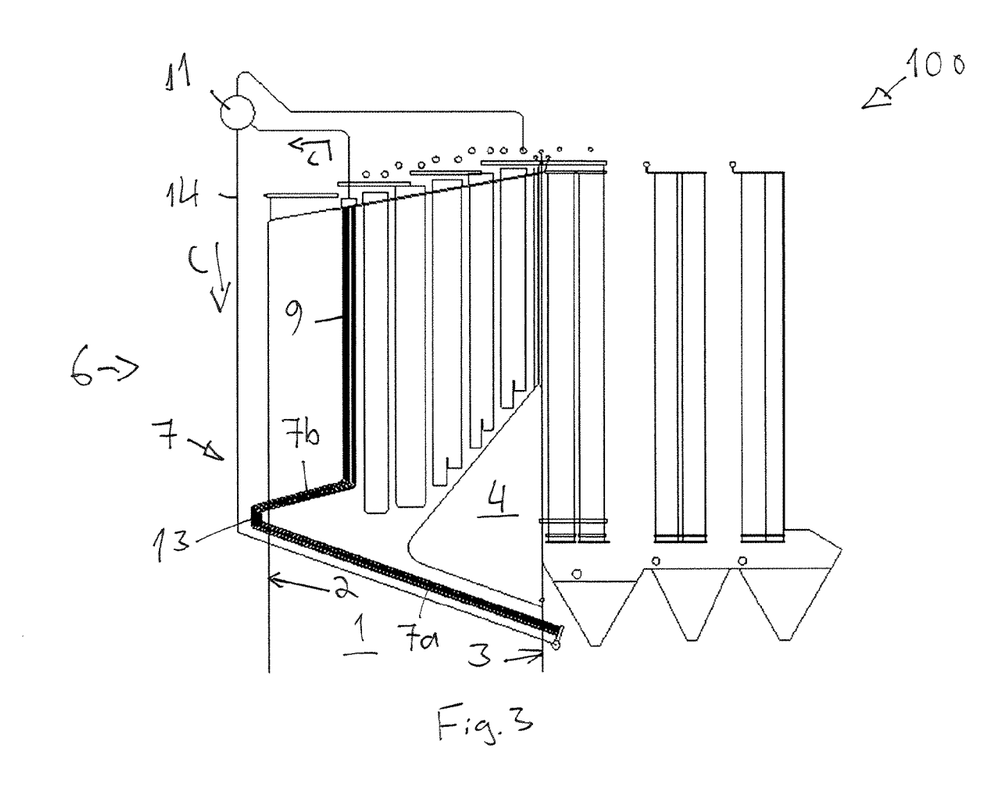
FIG. 3 is a schematic, partially sectional side view of a third chemical recovery boiler.

FIG. 3 is a schematic, partially sectional side view of a third chemical recovery boiler. In an embodiment, such as shown in FIG. 3, the turn 13 is arranged on the front wall 2 side of the furnace 1, either outside the volume of the furnace as shown in FIG. 3, or inside said volume of the furnace. An advantage of this kind of construction is that due to resistance of flow caused by the lower part 7*a* and upper part 7*b* of the obliquely arranged screen pipe section, flue gases tend to flow towards the superheaters 5, i.e. through the lower part 7*a* only, instead of flowing directly upwards in the upper part of the furnace 1 and through combined resistance of flow of the lower part 7*a* and upper part 7*b*. A result of this flowing phenomenon is more effective heat transfer taking place in the superheaters 5.

The lower part 7*a* of the obliquely arranged screen pipe section is positioned under the nose arch 4. An advantage is that the length of the lower part 7*a* serving as a heat surface may be maximised, and thus also the heat transfer from the hot furnace into the cooling fluid may be maximised.

According to an aspect, the vertically arranged screen pipe section 9 is arranged before any of superheaters 5 of the chemical recovery boiler. So, all the screen pipe system 6 is positioned before any of the superheaters 5 or any other heat surfaces of the chemical recovery boiler. It is to be noted here that all the embodiments of the obliquely arranged screen pipe sections 7 disclosed in this description may be connected with all the embodiments of the vertically arranged screen pipe sections 9 disclosed in this description. It is also to be noted that all the screen pipe systems 6 disclosed herein may also be arranged to operate as a superheater.

Figure 4:
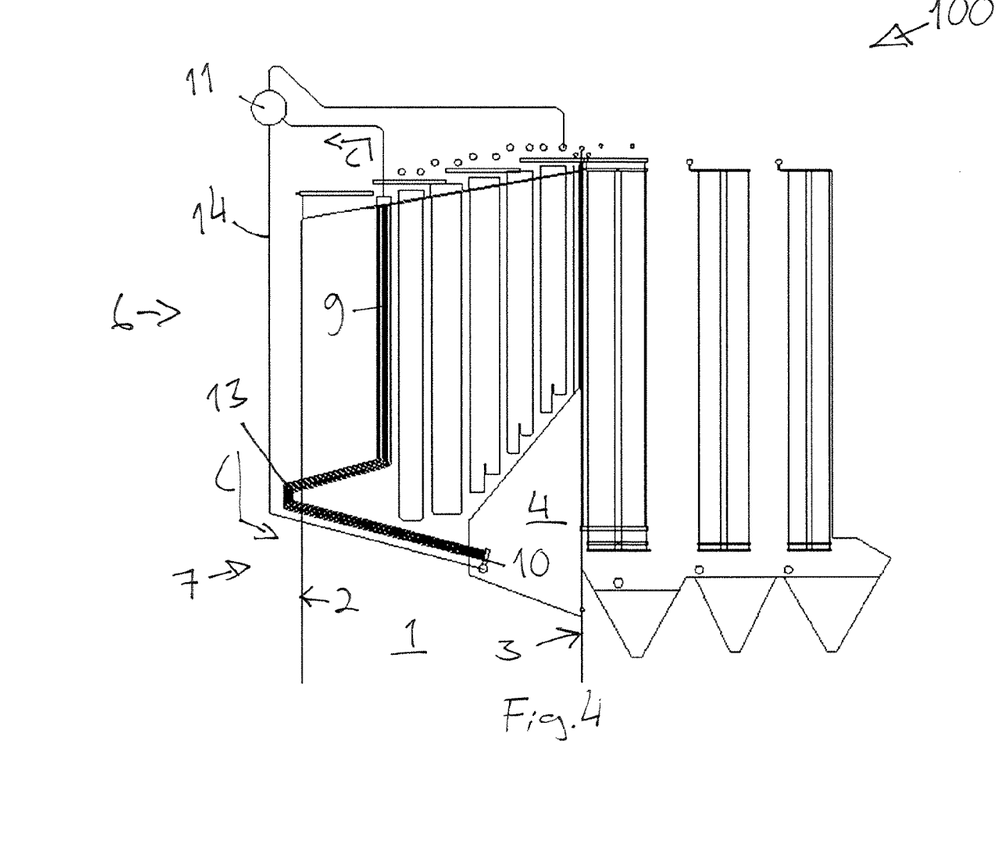
FIG. 4 is a schematic, partially sectional side view of a fourth chemical recovery boiler.

FIG. 4 is a schematic, partially sectional side view of a fourth chemical recovery boiler. As already disclosed, the lower end 10 of the obliquely arranged screen pipe section 7 may receive cooling fluid from the drum 11 of the chemical recovery boiler 100. It is also disclosed already that the turn 13 may be is arranged on the front wall 2. In an embodiment, the lower end 10 of the screen pipe system is arranged inside the nose arch 4 as shown in FIG. 4.

An advantage is more effective heat transfer taking place in the superheaters 5, similarly as described above in connection with FIG. 3.

Another advantage is that the structure of the obliquely arranged screen pipe section 7 is short and rigid.

One or more feed pipes 14 feeding the cooling fluid in the lower end 10 may be arranged to pass the furnace 1 along the side walls of the furnace 1.

The feed pipe 14 is connected to the bottom of the drum 11 and therefore the cooling fluid fed into the lower end 10 is water. However, the feed pipe 14 may also be connected to upper parts of the drum 11 in order to feed steam in the screen pipe system 6.

Figure 5:
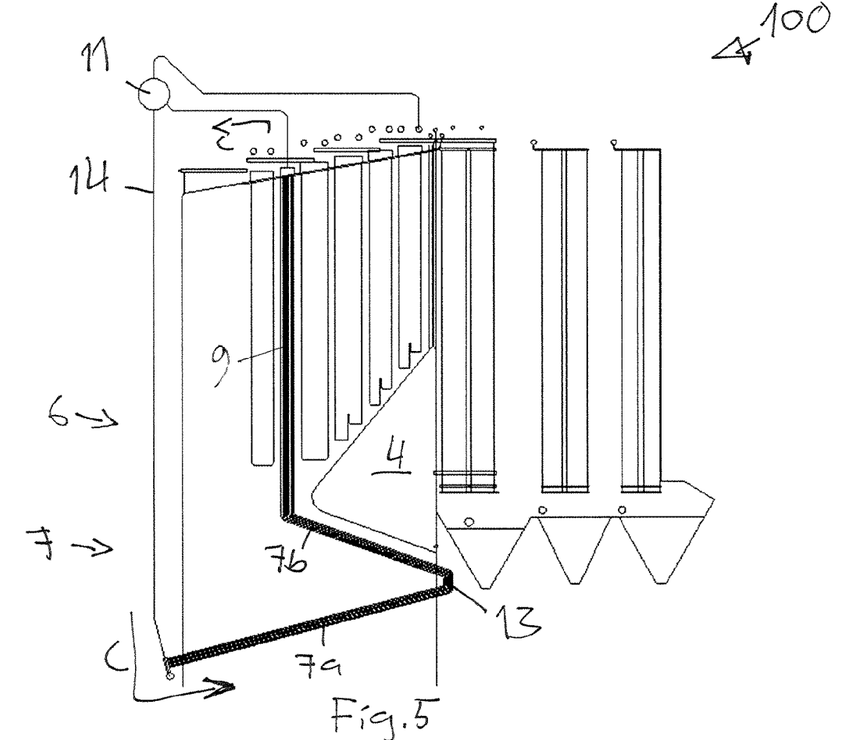
FIG. 5 is a schematic, partially sectional side view of a fifth chemical recovery boiler.

FIG. 5 is a schematic, partially sectional side view of a fifth chemical recovery boiler. This embodiment is very similar to the embodiment shown in FIG. 1. However, the turn 13 is now arranged under the nose arch 4.

An advantage is that the length of the obliquely arranged screen pipe section 7 serving as a heat surface may be maximised.

Figure 6:
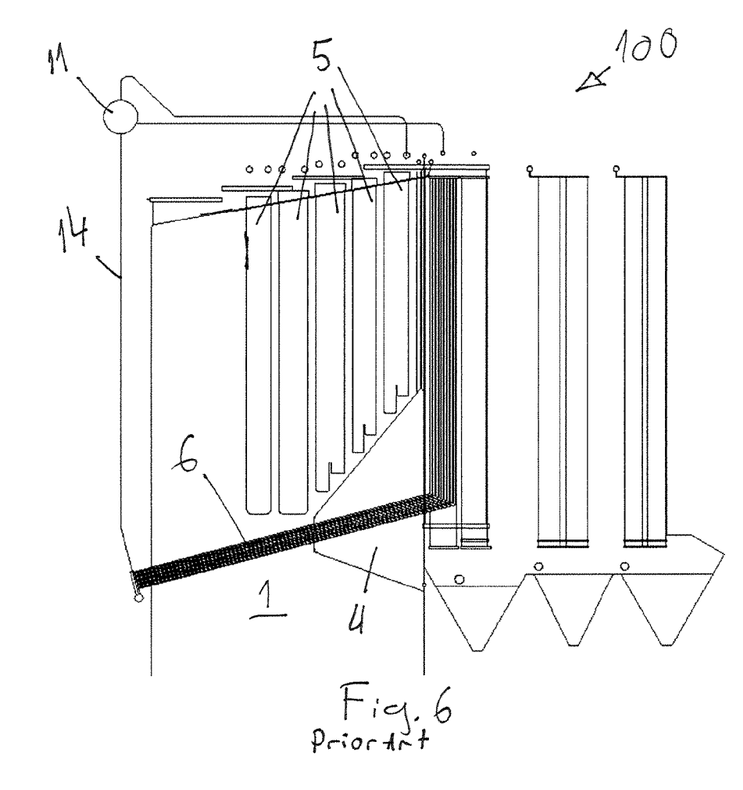
FIG. 6 is a schematic, partially sectional side view of a prior art chemical recovery boiler.

FIG. 6 is a schematic, partially sectional side view of a prior art chemical recovery boiler. As it can immediately be seen, the screen pipe system 6 penetrates through the nose arch 4 and extends in the second pass of the chemical recovery boiler 100. There is a quite large length of the screen pipe system 6 that are not heated by flue gases, being thus ineffective. The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE NUMERALS 1 furnace
2 front wall
3 back wall
4 nose arch
5 superheater
6 screen pipe system
7 obliquely arranged screen pipe section
7a lower part
7b upper part
8 screen pipe
9 vertically arranged screen pipe section
10 lower end
11 drum
12 upper end
13 turn
14 feed pipe
15 outlet header
100 chemical recovery boiler
C cooling fluid

The invention claimed is:

1. A chemical recovery boiler, the boiler comprising:
a furnace for recovery of chemicals and thermal energy generated in a burning process and comprising:
a front wall,
a back wall, the back wall comprising a nose arch, and
at least one superheater arranged in an upper part of the furnace, and
a screen pipe system comprising:
an obliquely arranged screen pipe section positioned before/under the at least one superheater in the furnace, the obliquely arranged screen pipe section comprising screen pipes ascending either:
(i) from the front wall to the back wall, and arranged to turn back in a turn from the back wall and extend obliquely upwards from the back wall, or
(ii) from the back wall to the front wall, and arranged to turn back in a turn from the front wall and extend obliquely upwards from the front wall, and
a vertically arranged screen pipe section extending from the obliquely arranged screen pipe section, wherein screen pipes of the vertically arranged screen pipe section extend parallel with the at least one superheater in the upper part of the furnace,
wherein the obliquely arranged screen pipe section is positioned to penetrate through the either the front wall or the back wall, such that the turn, where the obliquely arranged screen pipe section turns back into the furnace, is placed outside of the furnace.

2. The chemical recovery boiler as claimed in claim 1, wherein the lower end of the obliquely arranged screen pipe section is arranged to receive cooling fluid from the drum of the chemical recovery boiler.

3. The chemical recovery boiler as claimed in claim 1, wherein the upper end of the vertically arranged screen pipe section is arranged to receive cooling fluid from the drum of the chemical recovery boiler.

4. The chemical recovery boiler as claimed in claim 1, wherein the cooling fluid received by the screen pipe system comprises water.

5. The chemical recovery boiler as claimed in claim 1, wherein the cooling fluid received by the screen pipe system comprises steam.

6. The chemical recovery boiler as claimed in claim 1, wherein the turn is arranged on the front wall.

7. The chemical recovery boiler as claimed in claim 1, wherein the turn is arranged on the back wall.

8. The chemical recovery boiler as claimed in claim 7, wherein the turn is arranged on the nose arch.

9. The chemical recovery boiler as claimed in claim 1, wherein the turn is arranged inside the furnace.

10. The chemical recovery boiler as claimed in claim 1, wherein the vertically arranged screen pipe section is arranged before any of the at least one superheaters.

11. The chemical recovery boiler as claimed in claim 1, wherein the vertically arranged screen pipe section is arranged between two superheaters.

12. The chemical recovery boiler as claimed in claim 1, wherein the obliquely arranged screen pipe section comprising screen pipes ascending to the turn has an angle α to horizontal level, said angle α being in range of 5° to 20°.

13. The chemical recovery boiler as claimed claim 1, wherein the obliquely arranged screen pipe section comprising screen pipes ascending from the turn to the vertically arranged screen pipe section has an angle β to horizontal level, said angle β being in range of 5° to 20°.

* * * * *